US012340772B2

(12) United States Patent
Tang et al.

(10) Patent No.: US 12,340,772 B2
(45) Date of Patent: Jun. 24, 2025

(54) VIEW ANGLE COMPENSATION

(71) Applicant: TCL CHINA STAR OPTOELECTRONICS TECHNOLOGY CO., LTD., Guangdong (CN)

(72) Inventors: Xueqi Tang, Guangdong (CN); Weisheng Zheng, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/509,331

(22) Filed: Nov. 15, 2023

(65) Prior Publication Data

US 2024/0321227 A1 Sep. 26, 2024

(30) Foreign Application Priority Data

Mar. 21, 2023 (CN) ......................... 202310281196.5

(51) Int. Cl.
*G09G 3/36* (2006.01)

(52) U.S. Cl.
CPC ... *G09G 3/3607* (2013.01); *G09G 2320/0242* (2013.01); *G09G 2320/028* (2013.01); *G09G 2320/0673* (2013.01)

(58) Field of Classification Search
CPC ......................... G09G 2320/028; G02F 1/1323
See application file for complete search history.

(56) References Cited

U.S. PATENT DOCUMENTS

| | | | | |
|---|---|---|---|---|
| 2019/0012952 A1* | 1/2019 | Lai | ........................ | G09G 3/3607 |
| 2021/0074229 A1* | 3/2021 | Hsu | ........................ | G09G 3/3607 |
| 2023/0205014 A1* | 6/2023 | Zhao | .................... | G09G 3/3607 349/56 |

* cited by examiner

*Primary Examiner* — Sanjiv D. Patel
(74) *Attorney, Agent, or Firm* — PV IP PC; Wei Te Chung

(57) ABSTRACT

A method for view angle compensation, includes: obtaining initial pixel data of a to-be-displayed image; performing a region detection on the initial pixel data to obtain a target pixel region in which a target pixel corresponding to target pixel data in the initial pixel data is located; pre-processing the initial pixel data to obtain intermediate pixel data; determining to-be-compensated pixel data in the intermediate pixel data based on the target pixel region; and performing a view angle compensation on the to-be-compensated pixel data in the intermediate pixel data to obtain display pixel data.

17 Claims, 5 Drawing Sheets

VIEW ANGLE COMPENSATION

CROSS-REFERENCE TO RELATED APPLICATION

This application claims the priority to Chinese Application No. 202310281196.5, filed on Mar. 21, 2023. The contents of which are incorporated herein by reference in their entireties.

FIELD

The present disclosure relates to image display technologies, and more particularly, to a method and device for view angle compensation, a computer device, and a storage medium.

BACKGROUND

With an increasing diversity of people's life and work scenes, application scenes of large-sized LCDs are becoming more and more widespread. For large-sized LCDs, it is first necessary to solve a problem of view angle defects. Therefore, a View Angle Compensation algorithm (i.e., VAC algorithm) for view angle defects of large-sized LCDs emerges.

A principle of currently known VAC algorithms is to replace an initial grayscale with a relatively high (H) grayscale and a relatively low (L) grayscale, to ensure that a relationship between front-view brightness and grayscale is unchanged, and to correct a relationship between side-view brightness and grayscale. Applying the VAC algorithm in a high-frequency region (i.e., a region with a great gray-scale difference between adjacent pixels) will cause different degrees of color shift and aliasing. Therefore, the VAC algorithm may detect high-frequency regions when compensating, thereby compensating only pixels in non-high-frequency regions.

However, there is a problem of poor accuracy when detecting high-frequency regions, and consequently, an effect of view angle compensation is poor.

SUMMARY

In one or more embodiments of the present disclosure, a method for view angle compensation includes: obtaining initial pixel data of a to-be-displayed image; performing a region detection on the initial pixel data to obtain a target pixel region in which a target pixel corresponding to target pixel data in the initial pixel data is located; pre-processing the initial pixel data to obtain intermediate pixel data; determining to-be-compensated pixel data in the intermediate pixel data based on the target pixel region; and performing a view angle compensation on the to-be-compensated pixel data in the intermediate pixel data to obtain display pixel data.

In one or more embodiments, the pre-processing of the initial pixel data to obtain the intermediate pixel data includes: processing the initial pixel data by a first algorithm to obtain the intermediate pixel data. The first algorithm is for correcting a shift of grayscale of chroma.

In one or more embodiments, the processing of the initial pixel data by the first algorithm to obtain the intermediate pixel data includes: obtaining a target mapping relationship of grayscale and chroma; and determining the intermediate pixel data based on chroma of each initial pixel corresponding to the initial pixel data and the target mapping relationship.

In one or more embodiments, the pre-processing of the initial pixel data to obtain the intermediate pixel data includes: processing the initial pixel data by at least one preset algorithm to obtain the intermediate pixel data. The at least one preset algorithm includes at least one of algorithms for shift correction of grayscale and chroma, horizontal crosstalk compensation, splice compensation, external optical compensation, or defect compensation.

In one or more embodiments, the performing of the region detection on the initial pixel data to obtain the target pixel region in which the target pixel corresponding to target pixel data in the initial pixel data is located includes: obtaining pixel data corresponding to any two adjacent initial pixels in the initial pixel data; determining a grayscale difference between the two adjacent initial pixels; in response to determining that the grayscale difference is greater than a preset grayscale difference, determining the pixel data corresponding to the two adjacent initial pixels as target pixel data; and determining a region in which a plurality of target pixels corresponding to the target pixel data are located as the target pixel region.

In one or more embodiments, the determining of the to-be-compensated pixel data in the intermediate pixel data based on the target pixel region includes: determining other pixel data in the intermediate pixel data except for pixel data of intermediate pixel corresponding to the target pixel region as the to-be-compensated pixel data.

In one or more embodiments, the performing of the view angle compensation on the to-be-compensated pixel data in the intermediate pixel data to obtain the display pixel data includes: determining an average grayscale of all to-be-compensated pixels corresponding to the to-be-compensated pixel data on each color channel; determining a color channel with a lowest average grayscale as a target color channel; and performing the view angle compensation on the target color channel on the to-be-compensated pixel data.

In one or more embodiments of the present disclosure provides a view angle compensation device includes: a data obtaining module configured to obtain initial pixel data of a to-be-displayed image; a region detection module configured to perform region detection on the initial pixel data to obtain a target pixel region in which a target pixel corresponding to target pixel data in the initial pixel data is located; a pre-processing module configured to perform pre-processing on the initial pixel data to obtain intermediate pixel data; and a view angle compensation module configured to determine to-be-compensated pixel data in the intermediate pixel data based on the target pixel region, and perform view angle compensation on the to-be-compensated pixel data in the intermediate pixel data to obtain display pixel data.

In one or more embodiments of the present disclosure, a computer device includes a memory and a processor; The memory stores a computer program, and the processor is configured to run the computer program in the memory to perform the steps in the method for view angle compensation in any of the above-described embodiments.

In one or more embodiments of the present disclosure, a storage medium having a computer program stored thereon, the computer program being loaded by a processor to perform the steps in the method for view angle compensation in any of the above embodiments.

DETAILED DESCRIPTION

Some embodiments of the present disclosure will be described in detail below with reference to the accompanying drawings. The embodiments are described for illustrative purposes only and are not intended to limit the scope of the present disclosure.

In the description of the present disclosure, it is to be understood that terms "first" and "second" are used for descriptive purposes only and are not to be construed as indicating or implying relative importance or implying number of indicated technical features. Thus, features limited by "first" and "second" may explicitly or implicitly include one or more features. In the description of the present disclosure, "multiple" means two or more unless expressly and specifically defined otherwise. In the present disclosure, a term "illustrative" is used to mean "used as an example or illustration". Any embodiment described as "illustrative" in the present disclosure is not necessarily to be construed as preferred or advantageous over other embodiments. To enable those skilled in the art to implement and use the present disclosure, the following description is given. In the following description, details are set forth for purposes of explanation. It will be appreciated by those skilled in the art that the present disclosure may be implemented without these specific details. In other instances, well-known structures and procedures will not be set forth in detail, so as to prevent unnecessary details from obscuring the description of the present disclosure. Accordingly, the present disclosure is not intended to be limited to the embodiments shown, but is to be accorded the widest scope consistent with the principles and features disclosed herein.

A method for view angle compensation in one or more embodiments of the present disclosure is applied to a device for view angle compensation. The device for view angle compensation is provided on a computer device. The computer device may be a terminal, for example, a mobile phone, a tablet computer, a server, or a service cluster composed of multiple servers.

Figure 1:
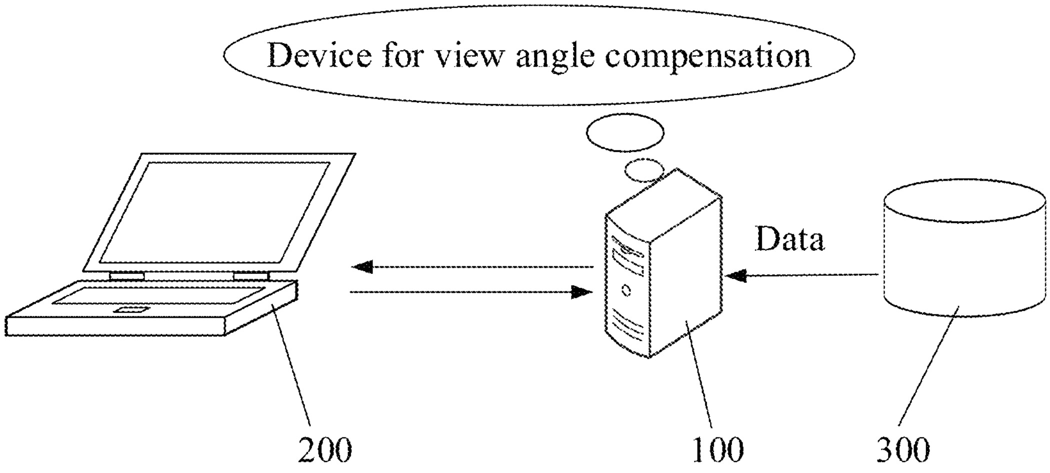
FIG. 1 is a schematic diagram of an application scenario of a method for view angle compensation in one or more embodiments of the present disclosure.

FIG. 1 is a schematic diagram of an application scenario of a method for view angle compensation in one or more embodiments of the present disclosure. As shown in FIG. 1, an application scenario of the method for view angle compensation in one or more embodiments of the present disclosure includes a computer device 100 (a device for view angle compensation is integrated in the computer device 100), and a computer readable storage medium corresponding to the method for view angle compensation is executed in the computer device 100 to perform steps of the method for view angle compensation.

It will be appreciated that the computer device in the application scenario of the method for view angle compensation shown in FIG. 1, or apparatuses included in the computer device, does not constitute a limitation on the embodiments of the present disclosure. That is, number and type of apparatuses included in the application scenario of the method for view angle compensation, or number and type of devices included in each of the apparatuses do not affect overall implementations of technical solutions in one or more embodiments of the present disclosure, and may be considered as equivalent replacements or derivatives of technical solutions claimed in one or more embodiments of the present disclosure.

The computer device 100 in one or more embodiments of the present disclosure may be a stand-alone device, or may be a device network or a device cluster composed of devices. For example, the computer device 100 described in one or more embodiments of the present disclosure includes, but is not limited to, a computer, a network host, a single network device, a set of multiple network devices, or a cloud device composed of multiple devices. The cloud device consists of a large number of Cloud Computing-based computers or network devices.

Those skilled in the art will understand that the application scenario shown in FIG. 1 is only an application scenario corresponding to the technical solution of the present disclosure, and does not constitute a limitation on the application scenario of the technical solution of the present disclosure. Other application scenarios may further include more or fewer computer devices than those shown in FIG. 1, or a network connection relationship of computer devices. For example, only one computer device is shown in FIG. 1. It is understood that a scenario of the method for view angle compensation may further include one or more other computer devices, which is not specifically limited herein. The computer device 100 may also include a memory for storing information related to the method for view angle compensation.

In addition, in the application scenario of the method for view angle compensation in one or more embodiments of the present disclosure, the computer device 100 may be provided with a display device, or the computer device 100 is not provided with a display device and communicatively connected with an external display device 200. The display device 200 is configured to output a result of the method for view angle compensation executed in the computer device. The computer device 100 may have access to a background database 300 (the background database 300 may be a local memory of the computer device 100, and also may also be provided in the cloud) in which information related to the method for view angle compensation is stored.

It should be noted that the application scenario of the method for view angle compensation shown in FIG. 1 is merely an example. The application scenario of the method for view angle compensation described in one or more embodiments of the present disclosure is used to more clearly describe the technical solution of one or more embodiments of the present disclosure, and does not constitute a limitation on the technical solution provided in some embodiments of the present disclosure.

Based on the application scenario of the method for view angle compensation, an embodiment of the method for view angle compensation is proposed.

Figure 2:
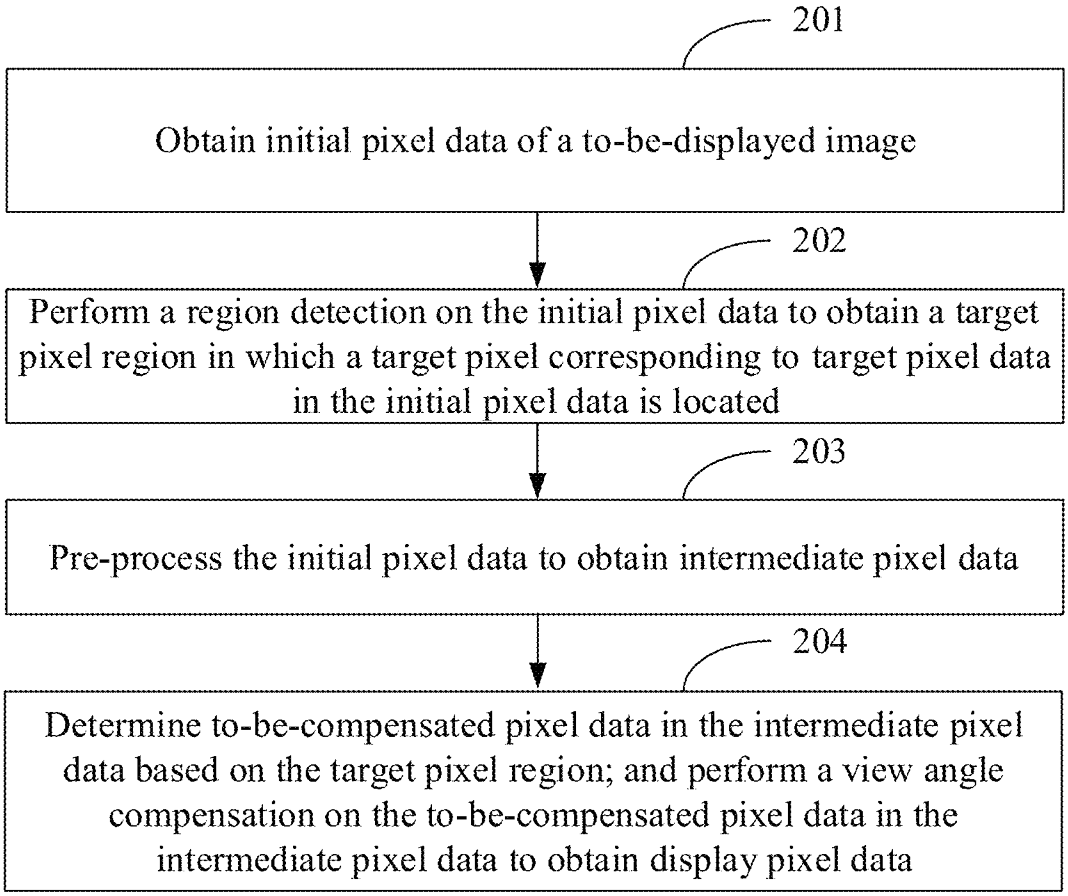
FIG. 2 is a schematic flow chart of a method for view angle compensation in one or more embodiments of the present disclosure.

As shown in FIG. 2, some embodiments of the present disclosure provide a method for view angle compensation comprising steps S201~S204:

At step 201, initial pixel data of a to-be-displayed image is obtained.

The initial pixel data refers to unpre-processed pixel data, and is not limited to most raw pixel data. The initial pixel data depends on specific processing steps included in a pre-processing step. For example, the pre-processing step includes only a shift correction step of grayscale and chroma, then the initial pixel data is input pixel data of the shift correction step of grayscale and chroma. For another example, the pre-processing step includes all steps before a step for view angle compensation (that is, in addition to the shift correction step of grayscale and chroma, there are other pre-compensation processing steps, such as a horizontal crosstalk compensation step, a splice compensation step, and/or an external optical compensation step), then the initial pixel data is the most raw pixel data, that is, pixel data directly obtained based on the to-be-displayed image.

In the pre-processing step, grayscales of pixels will be changed to a different degree when the pixel data is processed, regardless of the shift correction step of grayscale and chroma, the horizontal crosstalk compensation step, the splice compensation step, and/or the external optical compensation step.

At step 202, a region detection is performed on the initial pixel data to obtain a target pixel region in which a target pixel corresponding to the target pixel data in the initial pixel data is located.

The region detection generally refers to high-frequency region detection. A high-frequency region refers to a region in which grayscale of a pixel changes rapidly, and generally refers to edge and detail of an image. As mentioned above, in the pre-processing step, regardless of the specific processing step, grayscales of pixels are changed to a different degree. It can be seen that, at least some pixels have differences in grayscale between first intermediate pixel data after the pre-processing step and the initial pixel data before the pre-processing step, resulting in a large interference in a grayscale-based region detection step, and finally reducing accuracy of the region detection step.

For the high-frequency detection, an initial pixel in the initial pixel data corresponding to the high-frequency region is a target pixel.

At step 203, the initial pixel data is pre-processed to obtain intermediate pixel data.

The pre-processing step is a pre-step of the view angle compensation step. That is, input pixel data of the view angle compensation step is output pixel data of the pre-processing step, that is, the intermediate pixel data in the present step;

As mentioned in above steps, the pre-processing step may include one or more sub-steps, depending on requirements of the pre-processing. For example, in response to determining that only a color shift problem needs to be solved, only the shift correction step of grayscale and chroma is required. In response to determining that other problems still need to be solved, corresponding pre-processing steps are required, and details are not described herein.

At step 204, to-be-compensated pixel data in the intermediate pixel data is determined based on the target pixel region, and view angle compensation is performed on the to-be-compensated pixel data in the intermediate pixel data to obtain display pixel data.

The principle of the view angle compensation algorithm is to replace an initial grayscale of each to-be-compensated pixel in the to-be-compensated pixel data with a target grayscale that is relatively high (H) or relatively low (L), thereby ensuring that the relationship between front-view brightness and grayscale is unchanged, and correcting the relationship between side-view brightness and grayscale. Thus, a difference between front-view brightness and side-view brightness is reduced.

When performing a grayscale replacement in the view angle compensation step, an object to be achieved is that a low grayscale is lower and a high grayscale is higher. That is, for the initial grayscale belonging to the low grayscale, a target grayscale lower than the initial grayscale is used for replacement, and for the initial grayscale belonging to the high grayscale, a target grayscale higher than the initial grayscale is used for replacement, thereby increasing the difference between the low grayscale and the high grayscale. Whether a grayscale is high or low may be determined based a median of grayscales. In response determining that a grayscale is lower than the median of grayscales, the grayscale is determined to be low. In response determining that a grayscale higher than the median of grayscales, the grayscale is determined to be high.

In an RGB color model, each to-be-compensated pixel in the to-be-compensated pixel data includes a red sub-pixel of an R color channel, a green sub-pixel of a G color channel, and a blue sub-pixel of a B color channel, respectively. Therefore, in an actual process, the view angle compensation may be full color compensation, that is, compensation is performed for the red sub-pixel of the R color channel, the green sub-pixel of the G color channel, and the blue sub-pixel of the B color channel. In other embodiments, compensation may be performed for only one or two of the red sub-pixel of the R color channel, the green sub-pixel of the G color channel, or the blue sub-pixel of the B color channel. For example, compensation may be performed for only the red sub-pixel of the R color channel and the green sub-pixel of the G color channel, or the green sub-pixel of the G color channel and the blue sub-pixel of the B color channel, or the green sub-pixel of the G color channel, or the blue sub-pixel of the B color channel.

Compensation effect and efficiency of different compensation modes may be different. Therefore, it is necessary to adopt a corresponding compensation mode according to the actual situation.

Figure 3:
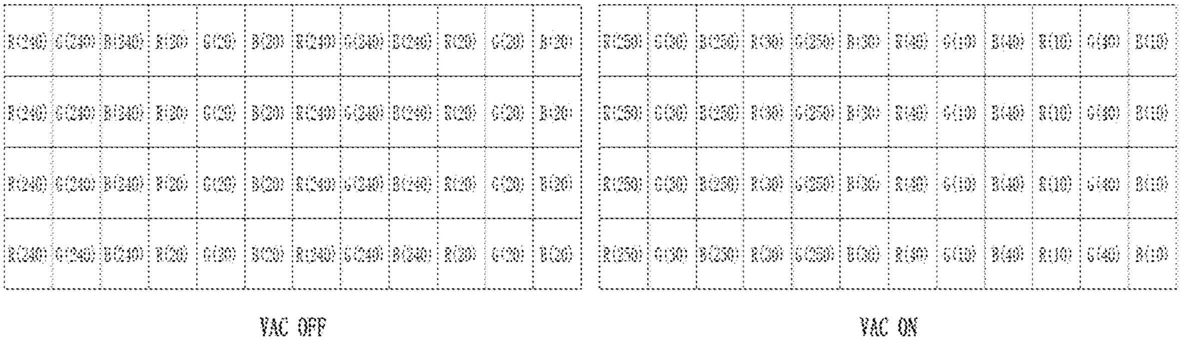
FIG. 3 is an effect diagram of view angle compensation for a high-frequency region in one or more embodiments of the present disclosure.

Since performing the view angle compensation in a high-frequency region (as shown in FIG. 3, a left part of the figure shows a microscopic schematic diagram of pixel data of a high-frequency region where the angle compensation is not performed, and a right part of the figure shows a microscopic schematic diagram of pixel data of a high-frequency region where the angle compensation is performed. In each block, a character before a bracket indicates a color of a sub-pixel (for example, R indicates red, G indicates green, B indicates blue), and a number in the bracket indicates brightness of the sub-pixel. It can be seen that the right part of the figure shows color shift and aliasing in, and therefore it is necessary to avoid performing the angle compensation in a high-frequency region) will cause different degrees of color shift and aliasing. Therefore, a determined to-be-compensated pixel is an intermediate pixel in a low-frequency region in the intermediate pixel data. As mentioned in above steps, the region detection generally refers to a high-frequency detection, that is, a detected target pixel region is a high-frequency pixel region. In other embodiments, the region detection may be a low-frequency detection, that is, the detected target pixel region is a low-frequency pixel region.

Whether the region detection is a high-frequency detection or a low-frequency detection does not affect a determination of a corresponding to-be-compensated pixel in the intermediate pixel data based on the obtained target pixel region.

It will be appreciated that the obtained target pixel region serves as a mask plate. Since a size of the mask plate coincides with an array size of the intermediate pixel data, a corresponding region can be determined in the intermediate pixel data to obtain a desired to-be-compensated pixel.

According to the method for view angle compensation, a region detection is directly performed on the initial pixel data without pre-processing to obtain the corresponding target pixel region. Compared with the intermediate pixel data obtained by pre-processing, the initial pixel data retains more original features, so that interference caused by loss of the original features during the region detection is prevented, thereby ensuring accuracy of the region detection, and further improving effect of subsequent view angle compensation.

Figure 4:
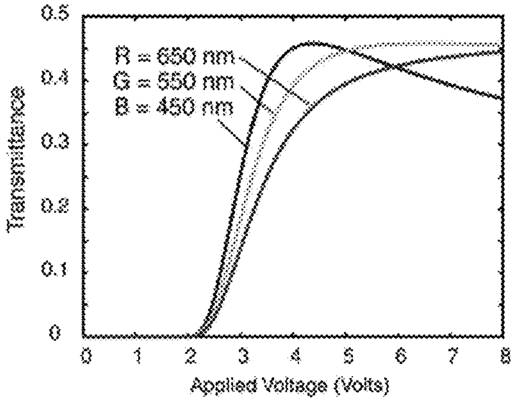
FIG. 4 is a graph of transmittance of light of different wavelengths in one or more embodiments of the present disclosure.
Figure 5:
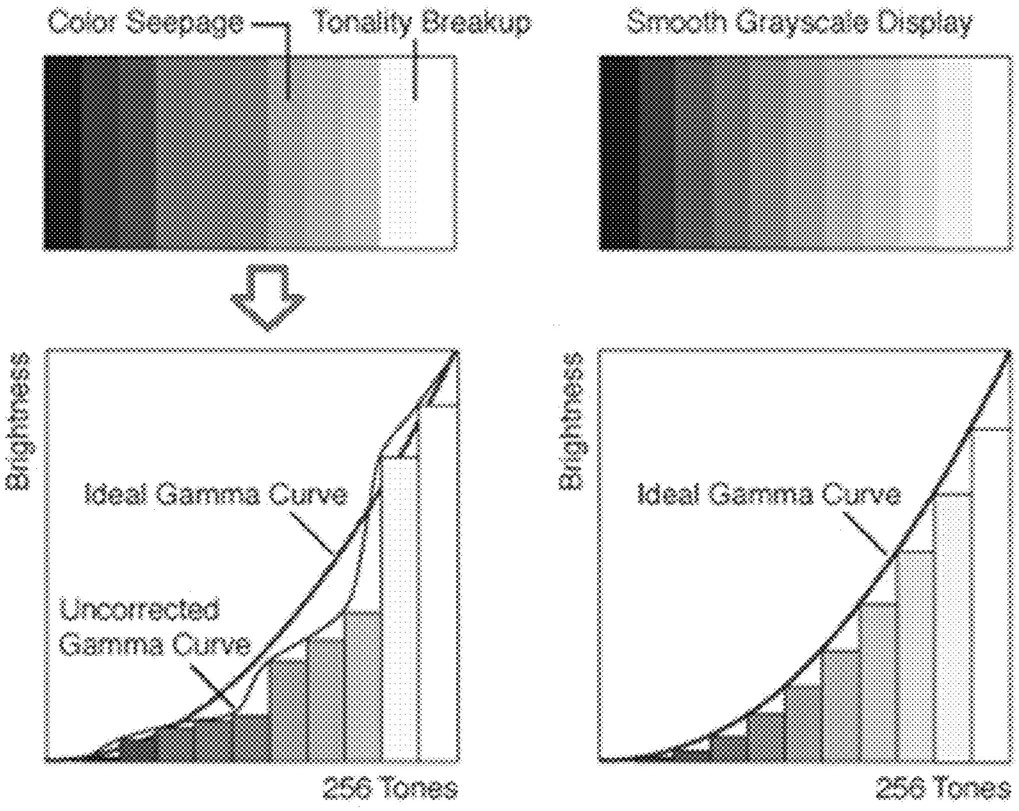
FIG. 5 shows Gamma curves before and after a shift correction in one or more embodiments of the present disclosure.

In one or more embodiments, the pre-processing of the initial pixel data to obtain the intermediate pixel data includes:

processing the initial pixel data by a first algorithm to obtain the intermediate pixel data. The first algorithm is used to correct shift of grayscale and chroma;

In one or more embodiments, the pre-processing step includes only the shift correction step of grayscale and chroma. It can be understood that the present embodiment only defines that only the shift correction step of grayscale and chroma is performed on the initial pixel data, but does not define that the initial pixel data is most raw pixel data. That is, the initial pixel data in one or more embodiments may actually be output data of the pre-compensation step mentioned in the above embodiment, and input data of the pre-compensation step is the most raw pixel data;

The shift correction step of grayscale and chroma is to prevent a phenomenon of color shift caused by different light transmittance when an image displayed by a display module is transmitted to the human eye. The transmittance of light of different wavelengths is different (in one or more embodiments, it is mainly red light corresponding to the red sub-pixel, green light corresponding to the green sub-pixel, and blue light corresponding to the blue sub-pixel. FIG. 4 shows transmittance curves of light of three colors), causing a shift of grayscale and chroma. The shift correction step of grayscale and chroma is essentially to convert a physical mapping relationship between grayscale and brightness into a human eye mapping relationship between grayscale and brightness on a basis of ensuring that the chroma changes smoothly (the chroma is determined by the brightness, that is, ensuring that brightness changes smoothly). Grayscale represents a voltage value of a corresponding pixel. The larger the grayscale is, the larger the voltage value is, and the higher the brightness is. Ideally, in the obtained human eye mapping relationship between grayscale and brightness, the brightness changes smoothly. A grayscale difference between two adjacent brightness varies, that is, the grayscale changes not smoothly. As shown in FIG. 5, in a left part of the figure, an uncorrected Gamma curve indicates a brightness change curve (i.e., a Gamma curve) sensed by the human eye when the grayscale changes smoothly, and an ideal Gamma curve indicates a corresponding brightness change curve when the grayscale changes smoothly at a physical level. It can be seen that, for a same grayscale, there is a significant difference between sensed brightness at the physical level and sensed brightness at an actual human eye level. If the brightness change curve at the physical level is directly used for image display, sensed chroma when light is transmitted to the human eye is not true chroma of the image, that is, a color shift is generated. Referring again to FIG. 5, in a right part of the figure, an ideal Gamma curve indicates a brightness change curve perceived by the human eye when the grayscale does not change smoothly. It can be seen that the obtained Gamma curve becomes smooth by adjusting the grayscale. In brief, a relationship between RGB value power is not a simple linear relationship, but a power function relationship. An exponent of the function is called Gamma value, generally 2.2, and a corresponding conversion process is called Gamma correction. For example, for a grayscale with power of 50%, the actual perceived brightness of the human eye is 72.97%. For a grayscale with actual perceived brightness of the human eye is 21.76%, the actual power is 50%. Therefore, considering a small storage range (0~255) and a balanced ratio of bright and dark portions, the grayscale in RGB requires Gamma correction instead of directly corresponding to the power value. It is necessary to perform a next calculation after a conversion to a physical optical power using a 2.2th power.

Figure 6:
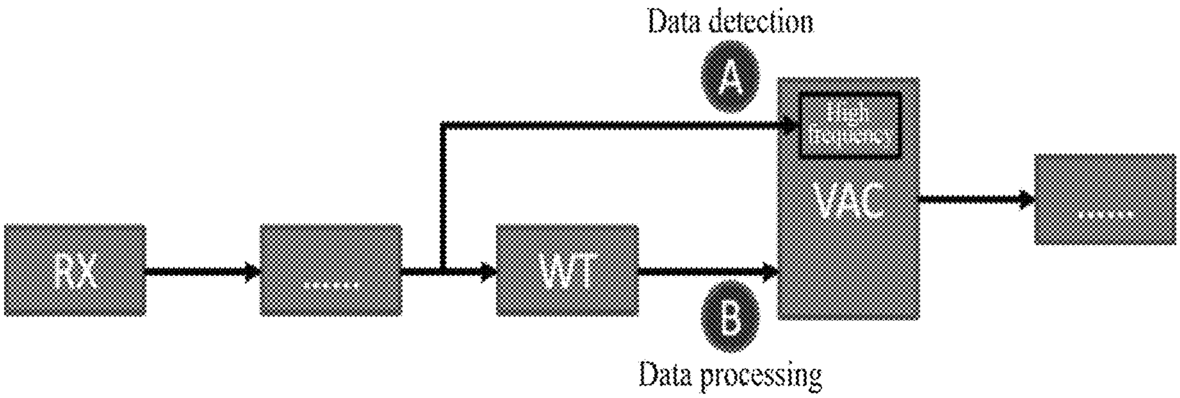
FIG. 6 is a schematic flow chart of a method in which a pre-processing step includes only a shift correction step in one or more embodiments of the present disclosure.

As shown in FIG. 6, white tracking (WT) is a shift correction step of grayscale and chroma, and VAC is a view angle compensation step. A high-frequency detection step is included in the view angle compensation step. It can be seen that the initial pixel data is input to WT for shift correction of grayscale and chroma and to VAC for high-frequency detection, respectively. Intermediate pixel data output from WT is input to VAC for view angle compensation. In FIG. 6, RX is the most raw pixel data, which may be equivalent to the initial pixel data, i.e., there are no further processing steps between RX and WT. RX and the initial pixel data may not be equivalent, i.e., there are further processing steps between RX and WT.

In one or more embodiments, the processing of the initial pixel data with the first algorithm to obtain the intermediate pixel data includes obtaining a target mapping relationship between grayscale and chroma; and determining the intermediate pixel data based on the chroma of each initial pixel corresponding to the initial pixel data and the target mapping relationship.

The target mapping relationship is a mapping relationship between grayscale and chroma at the human eye level.

The determining of the intermediate pixel data based on the chroma of each initial pixel corresponding to the initial pixel data and the target mapping relationship may be implemented by: for each initial pixel in the initial pixel data, determining a target grayscale corresponding to the chroma of the initial pixel based on the chroma of the initial pixel and the target mapping relationship; replacing the initial grayscale of the initial pixel with the target grayscale corresponding to the chroma of the initial pixel to obtain an intermediate pixel corresponding to the initial pixel; and obtaining first intermediate pixel data based on each intermediate pixel.

For example, an initial pixel includes three sub-pixels whose initial grayscales are respectively R1/G1/B1. Corresponding chroma of the initial pixel at the physical layer is A1. However, at the human eye level, the grayscale corresponding to the chroma A1 is not R1/G1/B1. Therefore, the target grayscale corresponding to the chroma A1 may be determined based on the target mapping relationship. For example, the target grayscale is R2/G2/B2. R1/G1/B1 is finally replaced with R2/G2/B2, so that when subsequent display is performed based on R2/G2/B2, the chroma perceived by the human eye is real chroma of the image, that is, A1.

In one or more embodiments, the pre-processing of the initial pixel data to obtain the intermediate pixel data includes: processing the initial pixel data by at least one preset algorithm to obtain the intermediate pixel data.

The at least one preset algorithm includes one or more of an algorithm for horizontal crosstalk compensation (Pattern Compensation), an algorithm for Stitch Compensation, external optical compensation (Demura), and an algorithm for defect compensation.

Demura specifically includes steps a~f.

At step a, a panel (TV/mobile/Tablet) is lightened up by Drive IC, and several screens (typically grayscale or RGB) are displayed.

At step b, above screen is shot using a high-resolution and high-precision industrial camera.

At step c, color distribution characteristics of pixels are analyzed based on the camera collected data, and a gamma exponent value for each pixel is calculated.

At step d, Mura data is identified from the exponent value using a related algorithm.

At step e, Demura data is generated based on the Mura data and a corresponding Demura compensation algorithm.

At step F, the Demura data is burned into a Flash ROM, a compensated screen is reshot, and whether the Mura data has been eliminated is confirmed.

Amount of ROM space occupied by the Demura data depends on screen resolution and compensation accuracy. In order to reduce capacity of a Memory, Pixel by Pixel compensation of 1×1 is generally not used, but Pixel units of 2×2, 4×4 . . . are used for obtaining a structure a compensation value.

Figure 7:
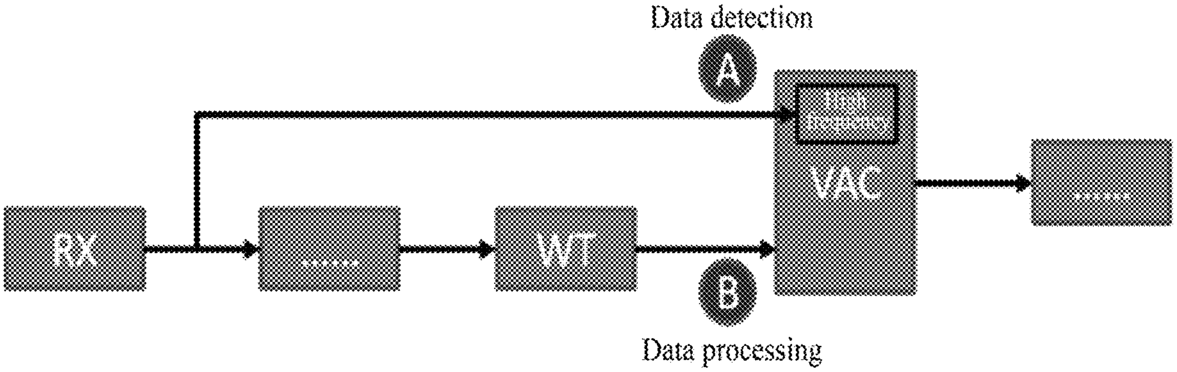
FIG. 7 is a schematic flow chart of a method in which a pre-processing step includes a shift correction step and other pre-compensation step in one or more embodiments of the present disclosure.
Figure 8:
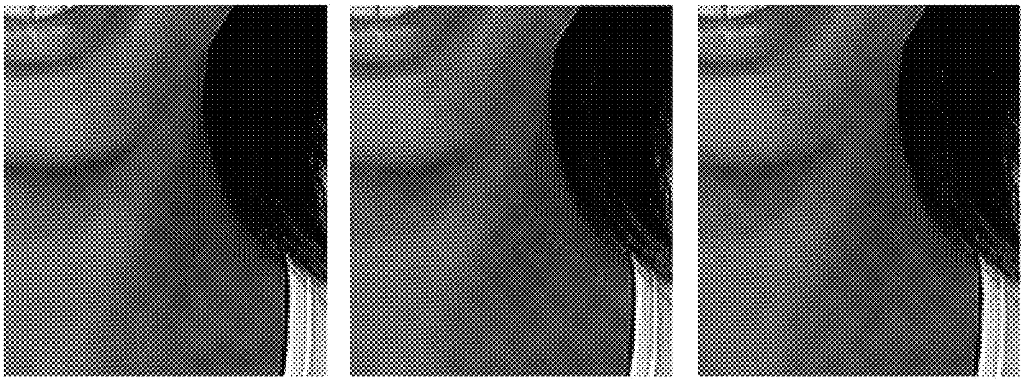
FIG. 8 is an image comparison diagram corresponding to display pixel data obtained by a region detection based on different pixel data in one or more embodiments of the present disclosure.

As shown in FIG. 7, RX is also the most raw pixel data, and the initial pixel data is RX. There may be no other processing steps between RX and WT. However, in one or more embodiments, there are other processing steps between RX and WT, including processing steps such as the above preset algorithm. In this case, using RX as the initial pixel data can further prevent interference caused by the pre-compensation processing step, and further improve accuracy of region detection. FIG. 8 shows an experimental result of one or more embodiments. A left part of the figure is an image corresponding to the most raw pixel data. A middle part of the figure is an image corresponding to first display pixel data. As for the first display pixel data, a pre-processing step is performed on the obtained most raw pixel data, and the pixel data obtained by the pre-processing step is determined as the initial pixel data. A region detection is performed on the initial pixel data to obtain a corresponding first target pixel region, and finally the view angle compensation is performed based on the first target pixel region to obtain the first display pixel data. A right part of the figure is an image corresponding to second display pixel data. As for the second display pixel data, a region detection is performed on the obtained most raw pixel data as the initial pixel data to obtain a corresponding second target pixel region, and finally the view angle compensation is performed based on the second target pixel region to obtain the second display pixel data. It can be clearly seen that in a case that the region detection is performed by using the pixel data obtained in the pre-processing step as the initial pixel data, since grayscales of pixels are changed in the pre-processing step, an error occurs in the region detection, which finally results in uneven skin tone in an image corresponding to the obtained first display pixel data. In a case that the region detection is directly performed by using the most raw pixel data as the initial pixel data, since grayscales of pixels are retained, an error in the region detection is reduced, thereby causing that uneven skin tone does not occur in an image corresponding to the finally obtained second display pixel data.

In one or more embodiments, the performing of the region detection is performed on the initial pixel data to obtain the target pixel region in which the target pixel corresponding to the target pixel data in the initial pixel data is located includes:

- obtaining pixel data corresponding to any two adjacent initial pixels in the initial pixel data, determining a grayscale difference between the two adjacent initial pixels, and in response to determining that the grayscale difference is greater than a preset grayscale difference, determining the pixel data of the two adjacent initial pixels as target pixel data; and
- determining a region in which multiple target pixels corresponding to the target pixel data are located as the target pixel region.

It has been mentioned above that the high-frequency region refers to a region in which frequency changes fast, and there is a large difference between adjacent grayscales in the pixel data. Therefore, in a case that the region detection is a high frequency detection, it is intended to detect all adjacent initial pixels with a grayscale difference greater than a preset grayscale difference in the initial pixel data.

A region corresponding each group of two adjacent initial pixels satisfying the detection requirement is a target pixel sub-region.

A target pixel region is obtained based on each target pixel sub-region.

All target pixel sub-regions are integrated to obtain a complete target pixel region.

Figure 9:
FIG. 9 is an image comparison diagram corresponding to pixel data before and after high-pass filtering in one or more embodiments of the present disclosure.

In a case that the region detection is a high-frequency detection, is it essentially a high-pass filtering on the initial pixel data. As shown in FIG. 9, a left part of the figure is an image corresponding to the initial pixel data, and a right part of the figure is an image corresponding to a target pixel region after the high-pass filtering. It can be seen that the high-frequency region is an edge region of a character.

In one or more embodiments, the determining of the to-be-compensated pixel data in the intermediate pixel data based on the target pixel region includes:

determining other pixel data in the intermediate pixel data except for pixel data of the intermediate pixel corresponding to the target pixel region as the to-be-compensated pixel data.

The determining of other pixel data in the intermediate pixel data except pixel data of the intermediate pixel corresponding to the target pixel region as the to-be-compensated pixel data specifically includes:

determining pixel data including all intermediate pixels corresponding to the target pixel region in the intermediate pixel data as mask pixel data; and determining pixel data including all intermediate pixels in the intermediate pixel data except for the mask pixel data as the to-be-compensated pixel data.

The above-mentioned embodiment has mentioned that the target pixel region is a high-frequency region, and the view angle compensation is for a pixel in a low-frequency region. Therefore, a pixel region directly determined in the intermediate pixel data by using the target pixel region as a mask is a mask pixel region, that is, a region in which view angle compensation is not performed. The mask pixel data includes all the intermediate pixels in the mask pixel region.

The mask pixel region determined in the intermediate pixel data is a high-frequency region, therefore, a region except for the mask pixel region is a low-frequency region. Since a pixel in the low-frequency region needs view angle compensation, a region except for the mask pixel region may be determined as a to-be-compensated pixel region, and the to-be-compensated pixel data includes all the intermediate pixels in the to-be-compensated pixel region.

In one or more embodiments, the performing of view angle compensation on the to-be-compensated pixel in the first intermediate pixel data to obtain the display pixel data includes:

determining an average grayscale of all to-be-compensated pixels corresponding to the to-be-compensated pixel data on each color channel;

determining a color channel with a lowest average grayscale as a target color channel; and performing view angle compensation on the target color channel on the to-be-compensated pixel data.

In one or more embodiments, it has been mentioned that full color compensation may be performed on the pixel, or compensation may be performed on only one or two kinds of sub-pixels. Therefore, in one or more embodiments, compensation is performed on only one kind of sub-pixel.

Since lower a grayscale of a sub-pixel is (it should be noted that the a sub-pixel with a lowest grayscale is a certain type of sub-pixel, such as red sub-pixel), effect after compensation is more obvious. Therefore, in one or more embodiments, compensation may be performed for the sub-pixel with the lowest grayscale. In a case of determining the sub-pixel with the lowest grayscale, any method may be used. In one or more embodiments, a method of average value may be used. That is, a sum of R grayscales, a sum of G grayscales, and a sum of B grayscales of all the to-be-compensated pixels are respectively calculated, then each sum is divided by a number of corresponding sub-pixels to obtain a corresponding average grayscale (that is, R average grayscale, G average grayscale, and B average grayscale), values of the R average grayscale, the G average grayscale and the B average grayscale are compared to determine a lowest average grayscale. For example, the R average grayscale is the lowest average grayscale, and view angle compensation is performed only for the grayscale of red sub-pixels subsequently.

In one or more embodiments, compensation is performed for only one kind of primary color sub-pixel, so that a difference between front-view brightness and side-view brightness can be reduced, and a brightness difference between the kind of primary color sub-pixels can be improved, thereby facilitating improvement or reduction of phenomenon of head shaking stripes. In addition, since the compensation needs to be performed for only one kind of the primary color sub-pixels, data processing amount is greatly saved with respect to a full color compensation, thus reducing processing cost, and improving processing efficiency.

Figure 10:
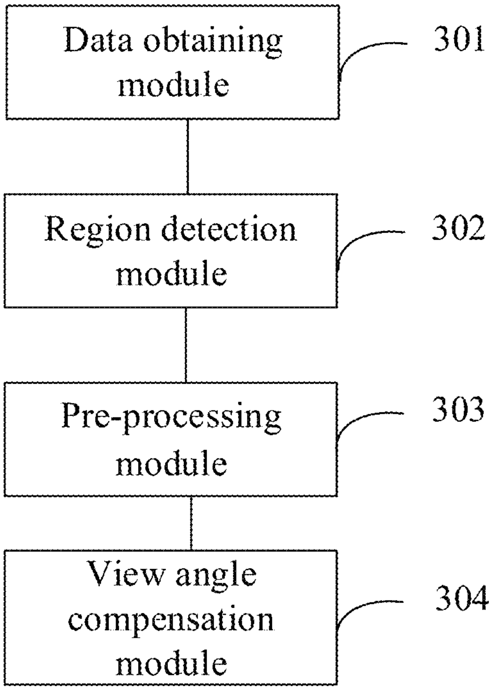
FIG. 10 is a schematic block diagram of a device for view angle compensation in one or more embodiments of the present disclosure.

As shown in FIG. 10, in one or more embodiments, a view angle compensation apparatus includes modules 301~304.

A data obtaining module 301 is configured to obtain initial pixel data of a to-be-displayed image.

A region detection module 302 is configured to perform region detection on the initial pixel data to obtain a target pixel region in which a target pixel corresponding to target pixel data in the initial pixel data is located.

A pre-processing module 303 is configured to perform pre-processing on the initial pixel data to obtain intermediate pixel data.

A view angle compensation module 304 is configured to determine to-be-compensated pixel data in the intermediate pixel data based on the target pixel region, and perform view angle compensation on the to-be-compensated pixel data in the intermediate pixel data to obtain display pixel data.

The view angle compensation device directly performs region detection on the initial pixel data without pre-processing to obtain a corresponding target pixel region. Compared with the intermediate pixel data obtained by pre-processing, the initial pixel data retains more original features, thereby preventing interference caused by loss of the original features during the region detection, thereby ensuring accuracy of the region detection, and further improving effect of subsequent view angle compensation.

In one or more embodiments, the pre-processing module is further configured to process the initial pixel data by a first algorithm to obtain intermediate pixel data. The first algorithm is used for correcting shift of grayscale of chroma.

In one or more embodiments, the pre-processing module is further configured to obtain a target mapping relationship of grayscale and chroma, and determine the intermediate pixel data based on chroma of each initial pixel corresponding to the initial pixel data and the target mapping relationship.

In one or more embodiments, the pre-processing module is further configured to process the initial pixel data by at least one preset algorithm to obtain the intermediate pixel data. The at least one preset algorithm includes an algorithm for shift correction of grayscale and chroma, horizontal crosstalk compensation, splice compensation, external optical compensation, and defect compensation.

In one or more embodiments, the region detection module is further configured to obtain pixel data corresponding to any two adjacent initial pixels in the initial pixel data; determine a grayscale difference between the two adjacent initial pixels; in response to determining that the grayscale difference is greater than a preset grayscale difference, determine the pixel data of the two adjacent initial pixels as target pixel data; and determine a region in which multiple target pixels corresponding to the target pixel data are located as the target pixel region.

In one or more embodiments, the view angle compensation module is further configured to determine other pixel data in the intermediate pixel data except for pixel data of the intermediate pixel corresponding to the target pixel region as the to-be-compensated pixel data.

In one or more embodiments, the view angle compensation module is further configured to determine an average grayscale of all to-be-compensated pixels corresponding to the to-be-compensated pixel data on each color channel, determine a color channel with a lowest average grayscale as a target color channel; and perform view angle compensation on the target color channel on the to-be-compensated pixel data.

Figure 11:
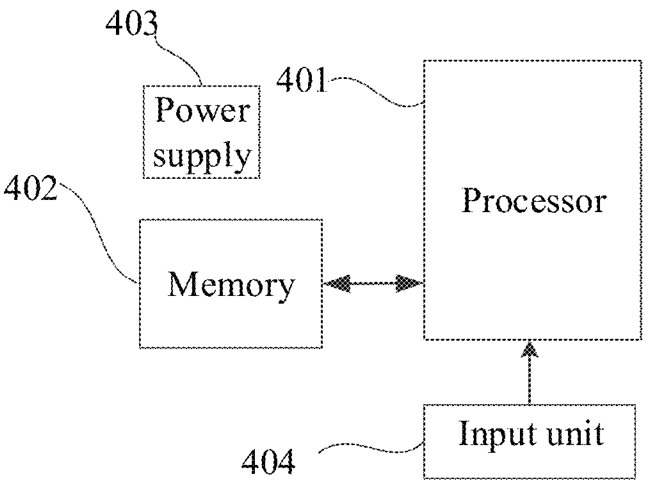
FIG. 11 is an internal block diagram of a computer device in one or more embodiments of the present disclosure.

FIG. 11 shows a structure of a computer device according to one or more embodiments of the present disclosure.

The computer device may include components such as a processor 401 having one or more processing cores, a memory 402 having one or more computer-readable storage mediums, a power supply 403, and an input unit 404. It will be appreciated by those skilled in the art that the structure of the computer device shown in FIG. 11 does not constitute a limitation on the computer device, and may include more or less components than illustrated, or may combine certain components, or different component arrangements.

The processor 401 is a control center of the computer device, which is connected to various parts of the entire computer device by various interfaces and lines, and performs various functions of the computer device and processes data by running or executing software programs and/or modules stored in the memory 402 and invoking data stored in the memory 402, thereby performing overall monitoring of the computer device. Optionally, the processor 401 may include one or more processing cores. Preferably, the processor 401 may integrate an application processor and a modem processor. The application processor mainly processes an operating system, a user interface, a computer program, and the like. The modem processor mainly processes wireless communication. It will be appreciated that the modem processor may also not be integrated into the processor 401.

The memory 402 may be used to store software programs and modules. The processor 401 performs various functional applications and data processing by running the software programs and modules stored in the memory 402. The memory 402 may mainly include a program storage region and a data storage region. The storage program region may store an operating system, a computer program required for at least one function (such as a sound playing function, an image playing function, and the like), and the like. The data storage region may store data or the like created based on use of a server. In addition, the memory 402 may include a high speed random access memory, and may also include a non-volatile memory, such as at least one magnetic disk storage device, flash memory device, or other volatile solid state storage device. Accordingly, the memory 402 may also include a memory controller to provide access to memory 402 by processor 401.

The computer device further includes a power supply 403 for supplying power to various components. Preferably, the power supply 403 may be logically connected to the processor 401 through a power management system, so that functions such as management of charging and discharging, and power consumption management are implemented by the power management system. The power supply 403 may further include at least one of DC or AC power supply, recharging system, power failure detection circuit, power converter or inverter, power status indicator, or any other component.

The computer device may also include an input unit 404. The input unit 404 may be configured to receive input number or character information and generate signal input of keyboard, mouse, joystick, optical or trackball related to user settings and functional control.

Although not shown, the computer device may also include a display unit or the like, and details are not described herein. Specifically, in one or more embodiments, the processor 401 in the computer device loads executable files corresponding to processes of one or more computer programs into the memory 402 according to following instructions, and the processor 401 executes computer programs stored in the memory 402 to perform following steps: obtaining initial pixel data of a to-be-displayed image; performing a region detection on the initial pixel data to obtain a target pixel region in which a target pixel corresponding to the target pixel data in the initial pixel data is located; pre-processing the initial pixel data to obtain intermediate pixel data; determining to-be-compensated pixel data in the intermediate pixel data based on the target pixel region; and performing view angle compensation on the to-be-compensated pixel data in the intermediate pixel data to obtain display pixel data.

The view angle compensation device directly performs region detection on the initial pixel data without pre-processing to obtain a corresponding target pixel region. Compared with the intermediate pixel data obtained by pre-processing, the initial pixel data retains more original features, thereby preventing interference caused by loss of the original features during the region detection, thereby ensuring accuracy of the region detection, and further improving effect of subsequent view angle compensation.

It will be appreciated by those of ordinary skill in the art that all or part of the steps in any of the methods of the above-described embodiments may be performed by a computer program or a relevant hardware controlled by a computer program. The computer program may be stored in a computer-readable storage medium and loaded and executed by a processor.

In one or more embodiments of the present disclosure, a storage medium stores multiple computer programs which are loadable by a processor to perform following steps: obtaining initial pixel data of a to-be-displayed image; performing a region detection on the initial pixel data to obtain a target pixel region in which a target pixel corresponding to the target pixel data in the initial pixel data is located; pre-processing the initial pixel data to obtain intermediate pixel data; determining to-be-compensated pixel data in the intermediate pixel data based on the target pixel region; and performing view angle compensation on the to-be-compensated pixel data in the intermediate pixel data to obtain display pixel data.

By the above storage medium, the region detection is directly performed on the initial pixel data without pre-processing to obtain a corresponding target pixel region. Compared with the intermediate pixel data obtained by pre-processing, the initial pixel data retains more original features, thereby preventing interference caused by loss of the original features during the region detection, thereby ensuring accuracy of the region detection, and further improving effect of subsequent view angle compensation.

It will be appreciated by those of ordinary skill in the art that any reference to memory, storage, database, or other media used in various embodiments of the present disclosure may include non-volatile and/or volatile memory. Non-volatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in a variety of forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus (Rambus) direct RAM (RDRAM), direct memory bus dynamic RAM (DRDRAM), and memory bus dynamic RAM (RDRAM).

Since the computer program stored in the storage medium can perform the steps in the method for view angle compensation according to any one of the embodiments of the present disclosure, the advantageous effects that can be achieved by the method for view angle compensation according to any one of the embodiments of the present disclosure can be realized, as described in detail in the foregoing embodiments, and details are not described herein.

Reference may be made to the previous embodiments for a specific implementation of each of the above operations, and details are not described herein.

In the above-mentioned embodiments, the description of each embodiment has its own emphasis, and for parts not described in detail in a certain embodiment, reference may be made to the above detailed description for other embodiments, and details are not described herein again.

The foregoing describes in detail a method, device, computer device and storage medium for view angle compensation according to the present disclosure, and the principles and embodiments of the present disclosure are described herein using specific examples. The foregoing description of the embodiments is merely intended to assist in understanding the method and the core concepts thereof. At the same time, variations in the detailed description and scope of the present disclosure will occur to those skilled in the art in accordance with the teachings of the present disclosure, and in light of the foregoing, the present specification is not to be construed as limiting the present disclosure.

Each of the technical features in the above embodiments may be combined arbitrarily. For the sake of brevity, not all possible combinations of each of the technical features in the above embodiments are described. However, as long as the combinations of these technical features are not inconsistent, the scope of the specification should be considered.

What is claimed is:

1. A method for view angle compensation, comprising:
- obtaining initial pixel data of a to-be-displayed image;
- obtaining pixel data corresponding to any two adjacent initial pixels in the initial pixel data;
- determining a grayscale difference between the two adjacent initial pixels;
- in response to determining that the grayscale difference is greater than a preset grayscale difference, determining the pixel data corresponding to the two adjacent initial pixels as target pixel data;
- determining a region in which a plurality of target pixels corresponding to the target pixel data are located as the target pixel region;
- pre-processing the initial pixel data to obtain intermediate pixel data;
- determining to-be-compensated pixel data in the intermediate pixel data based on the target pixel region; and
- performing a view angle compensation on the to-be-compensated pixel data in the intermediate pixel data to obtain display pixel data.

2. The method for view angle compensation according to claim 1, wherein the pre-processing of the initial pixel data to obtain the intermediate pixel data comprises:
- processing the initial pixel data by a first algorithm to obtain the intermediate pixel data, wherein the first algorithm is for correcting a shift of grayscale of chroma.

3. The method for view angle compensation according to claim 2, wherein the processing of the initial pixel data by the first algorithm to obtain the intermediate pixel data comprises:
- obtaining a target mapping relationship of grayscale and chroma; and
- determining the intermediate pixel data based on chroma of each initial pixel corresponding to the initial pixel data and the target mapping relationship.

4. The method for view angle compensation according to claim 1, wherein the pre-processing of the initial pixel data to obtain the intermediate pixel data comprises:
- processing the initial pixel data by at least one preset algorithm to obtain the intermediate pixel data, wherein the at least one preset algorithm includes at least one of algorithms for shift correction of grayscale and chroma, horizontal crosstalk compensation, splice compensation, external optical compensation, or defect compensation.

5. The method for view angle compensation according to claim 1, wherein the determining of the to-be-compensated pixel data in the intermediate pixel data based on the target pixel region comprises:
- determining other pixel data in the intermediate pixel data except for pixel data of intermediate pixel corresponding to the target pixel region as the to-be-compensated pixel data.

6. The method for view angle compensation according to claim 1, wherein the performing of the view angle compensation on the to-be-compensated pixel data in the intermediate pixel data to obtain the display pixel data comprises:
- determining an average grayscale of all to-be-compensated pixels corresponding to the to-be-compensated pixel data on each color channel;
- determining a color channel with a lowest average grayscale as a target color channel; and
- performing the view angle compensation on the target color channel on the to-be-compensated pixel data.

7. A computer device, comprising a memory and a processor, wherein the memory stores a computer program, and the processor is configured to run the computer program to perform operations comprising:
- obtaining initial pixel data of a to-be-displayed image;
- obtaining pixel data corresponding to any two adjacent initial pixels in the initial pixel data;
- determining a grayscale difference between the two adjacent initial pixels;
- in response to determining that the grayscale difference is greater than a preset grayscale difference, determining the pixel data corresponding to the two adjacent initial pixels as target pixel data;
- determining a region in which a plurality of target pixels corresponding to the target pixel data are located as the target pixel region;
- pre-processing the initial pixel data to obtain intermediate pixel data;
- determining to-be-compensated pixel data in the intermediate pixel data based on the target pixel region; and
- performing a view angle compensation on the to-be-compensated pixel data in the intermediate pixel data to obtain display pixel data.

8. The computer device according to claim 7, wherein the pre-processing of the initial pixel data to obtain the intermediate pixel data comprises:

processing the initial pixel data by a first algorithm to obtain the intermediate pixel data, wherein the first algorithm is for correcting a shift of grayscale of chroma.

9. The computer device according to claim 8, wherein the processing of the initial pixel data by the first algorithm to obtain the intermediate pixel data comprises:

obtaining a target mapping relationship of grayscale and chroma; and determining the intermediate pixel data based on chroma of each initial pixel corresponding to the initial pixel data and the target mapping relationship.

10. The computer device according to claim 7, wherein the pre-processing of the initial pixel data to obtain the intermediate pixel data comprises:

processing the initial pixel data by at least one preset algorithm to obtain the intermediate pixel data, wherein the at least one preset algorithm includes at least one of algorithms for shift correction of grayscale and chroma, horizontal crosstalk compensation, splice compensation, external optical compensation, or defect compensation.

11. The computer device according to claim 7, wherein the determining of the to-be-compensated pixel data in the intermediate pixel data based on the target pixel region comprises:

determining other pixel data in the intermediate pixel data except for pixel data of intermediate pixel corresponding to the target pixel region as the to-be-compensated pixel data.

12. The computer device according to claim 7, wherein the performing of the view angle compensation on the to-be-compensated pixel data in the intermediate pixel data to obtain the display pixel data comprises:

determining an average grayscale of all to-be-compensated pixels corresponding to the to-be-compensated pixel data on each color channel;

determining a color channel with a lowest average grayscale as a target color channel; and performing the view angle compensation on the target color channel on the to-be-compensated pixel data.

13. A non-transitory computer-readable storage medium storing a computer program loaded by a processor to perform operations comprising:

obtaining initial pixel data of a to-be-displayed image;

obtaining pixel data corresponding to any two adjacent initial pixels in the initial pixel data;

determining a grayscale difference between the two adjacent initial pixels;

in response to determining that the grayscale difference is greater than a preset grayscale difference, determining the pixel data corresponding to the two adjacent initial pixels as target pixel data;

determining a region in which a plurality of target pixels corresponding to the target pixel data are located as the target pixel region;

pre-processing the initial pixel data to obtain intermediate pixel data;

determining to-be-compensated pixel data in the intermediate pixel data based on the target pixel region; and performing a view angle compensation on the to-be-compensated pixel data in the intermediate pixel data to obtain display pixel data.

14. The non-transitory computer-readable storage medium according to claim 13, wherein the pre-processing of the initial pixel data to obtain the intermediate pixel data comprises:

processing the initial pixel data by a first algorithm to obtain the intermediate pixel data, wherein the first algorithm is for correcting a shift of grayscale of chroma.

15. The non-transitory computer-readable storage medium according to claim 14, wherein the processing of the initial pixel data by the first algorithm to obtain the intermediate pixel data comprises:

obtaining a target mapping relationship of grayscale and chroma; and determining the intermediate pixel data based on chroma of each initial pixel corresponding to the initial pixel data and the target mapping relationship.

16. The non-transitory computer-readable storage medium according to claim 13, wherein the pre-processing of the initial pixel data to obtain the intermediate pixel data comprises:

processing the initial pixel data by at least one preset algorithm to obtain the intermediate pixel data, wherein the at least one preset algorithm includes at least one of algorithms for shift correction of grayscale and chroma, horizontal crosstalk compensation, splice compensation, external optical compensation, or defect compensation.

17. The non-transitory computer-readable storage medium according to claim 13, wherein the determining of the to-be-compensated pixel data in the intermediate pixel data based on the target pixel region comprises:

determining other pixel data in the intermediate pixel data except for pixel data of intermediate pixel corresponding to the target pixel region as the to-be-compensated pixel data.

* * * * *